J. B. BOUDREAU, Jr.
SCRAP BOY FOR CRACKER CUTTING MACHINES AND THE LIKE.
APPLICATION FILED JAN. 12, 1918.
1,279,641.
Patented Sept. 24, 1918.
2 SHEETS—SHEET 1.
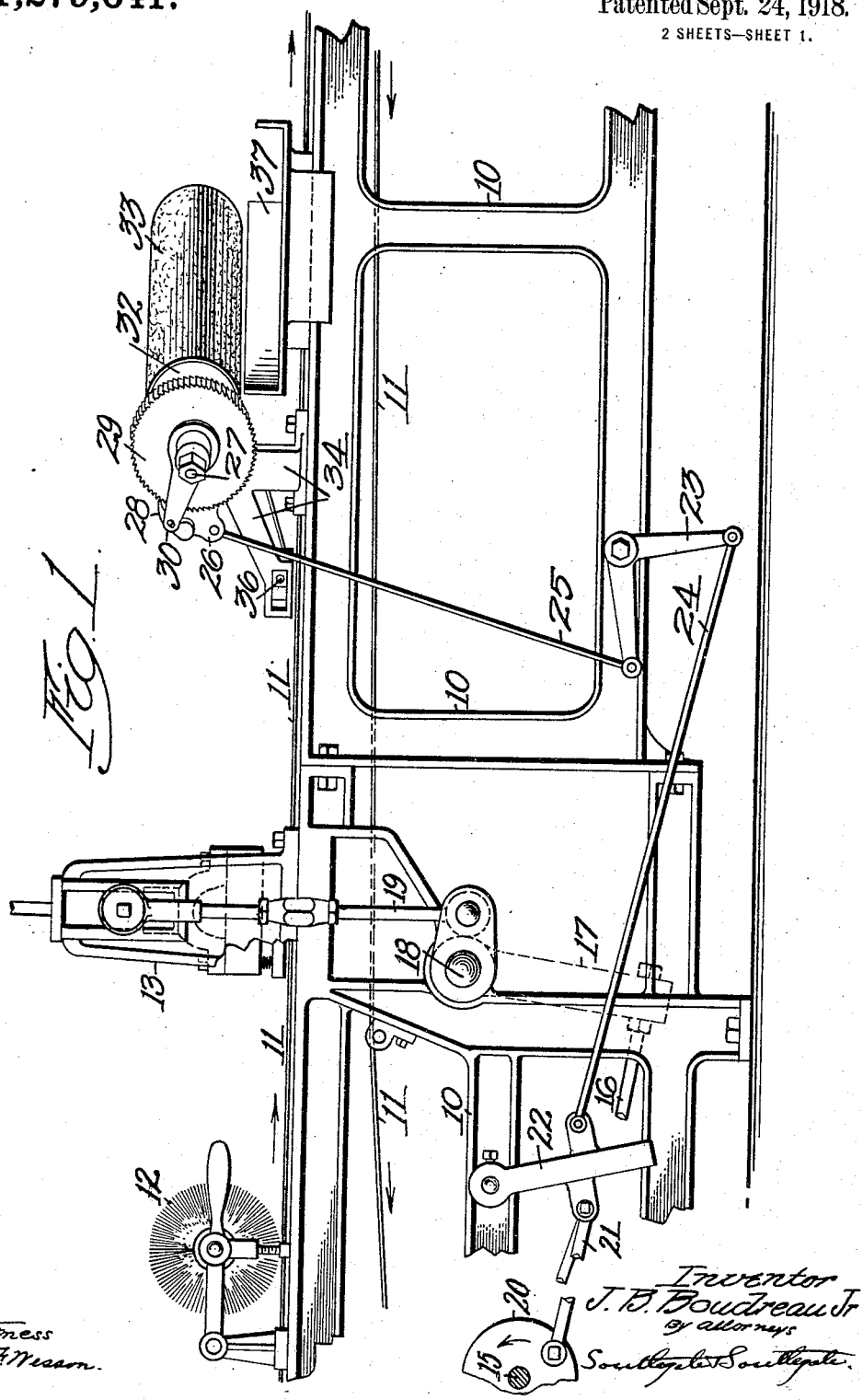

J. B. BOUDREAU, Jr.
SCRAP BOY FOR CRACKER CUTTING MACHINES AND THE LIKE.
APPLICATION FILED JAN. 12, 1918.
1,279,641.
Patented Sept. 24, 1918.
2 SHEETS—SHEET 2.
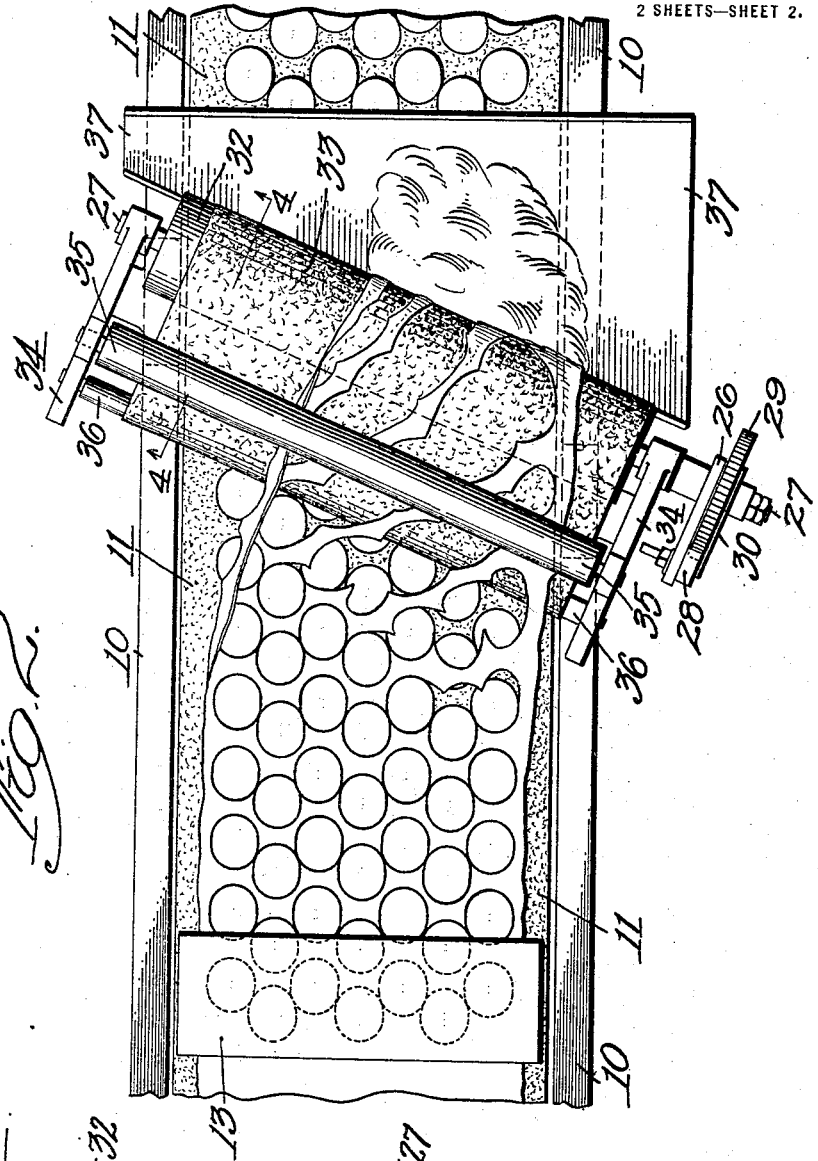

UNITED STATES PATENT OFFICE.

JOHN B. BOUDREAU, JR., OF WORCESTER, MASSACHUSETTS.

SCRAP-BOY FOR CRACKER-CUTTING MACHINES AND THE LIKE.

1,279,641.  Specification of Letters Patent.  Patented Sept. 24, 1918.

Application filed January 12, 1918. Serial No. 211,494.

*To all whom it may concern:*

Be it known that I, JOHN B. BOUDREAU, Jr., a citizen of the United States, residing at Worcester, in the county of Worcester and State of Massachusetts, have invented a new and useful Scrap-Boy for Cracker-Cutting Machines and the like, of which the following is a specification.

This invention relates to a so-called scrap-boy or scrap removing device for machines in which crackers, or the like are cut from a continuous sheet of dough.

The removal of the scraps from the blanks which are cut out of the dough is an easy matter in soft cake cutting machines in which the cutters and therefore the blanks are all spaced apart in transverse rows so that strings of scrap lie between each two adjacent cakes and these strings are all connected both longitudinally and transversely. This has been accomplished by mechanical means in some cases, but these devices have not been capable of removing the scrap without also displacing and frequently removing the blanks in the ordinary cracker cutting machines in which the dies are arranged in two series, those of one series each contacting with one of those of the next so as not to provide a string of scrap between them. Crackers are cut in this way in order to produce a greater number of crackers for a given amount of dough, and in a given time, and this advantage has been so great that heretofore employees have been stationed at the side of the machine to remove the scrap manually. The cracker dough is more firm and consistent than the cake dough.

This invention is designed to do away with this labor and the principal feature of it is the location of an endless apron intermittently operated by power as the cutter operates diagonally across the machine so as to take hold of the two selvages of the scrap at different points and always to take hold of the scrap on two sides of the blank at different points relative to the length of the machine and arranged to take up the intermediate strings of scrap by one end and draw them upon the apron in that way. Further objects and advantages of the invention will appear hereinafter.

Reference is to be had to the accompanying drawings in which—

Figure 1 is a side view of a well-known type of cracker machine showing a preferred embodiment of this invention applied thereto;

Fig. 2 is a plan of the same with some of the well-known mechanism omitted;

Fig. 3 is an end view of the ratchet for operating the scrap-boy, and

Fig. 4 is a sectional diagrammatic view on the line 4—4 of Fig. 2.

The invention is shown as applied to a machine for cutting out crackers involving a frame 10, a belt 11 on which the dough is fed under the brush 12 which smooths it out and under a cutting mechanism 13 which cuts out the blanks. These blanks are cut out slightly oblong in shape, the long diameter being arranged longitudinally of the belt 11. This distortion of the shape is remedied later by the employees who are obliged to move every piece back and forth with a rapid motion in order to load their peels with a complete layer of the cracker blanks. They take them immediately to the oven trays and deposit them thereon.

The cutter is operated from a crank on a shaft 15 by means of a link 16 which is connected with an oscillating bell-crank 17 on a shaft 18 having opposite adjustable links 19 connected to a vertical slide on which the cutters are mounted. The shaft 15 is provided with a crank 20 which by means of a link 21 oscillates a swinging member 22 and this operates a bell-crank 23 through a link 24. Another link 25 connected with this bell-crank oscillates an arm 26 loose on a shaft 27 which is located in an angular position with respect to the course of the belt 11. On this arm 26 is a ratchet pawl 28 adapted to engage a ratchet wheel 29 fixed to the shaft 27 for intermittently rotating this shaft. An arm 30 also on the shaft 27 controls the ratchet.

The relationship of the crank 20 with the crank that operates the link 16 is such that when the knives are cutting and therefore the sheet of dough at that instant is not being fed forward, the ratchet is being drawn back ready to start the wheel 29 again. As stated this wheel 29 is fixed on the shaft 27 and on this shaft is a roll 32 which, of course, partakes of the intermittent rotary motion. This roll is located angularly as indicated in Fig. 2 and is provided with an endless apron 33. The shaft 27 is mounted on a pair of fixed frames 34 one at each side of the machine, these support an idler roller 35 which bears down on the apron 33 at the top. There is also another roll 36 which is not driven except by the apron 33 which holds this apron down adjacent to the belt 11. The axes of these rolls are horizontal.

In the operation of the device the crackers, or other articles to be produced are cut in the usual manner by the cutting devices 13 while the sheet of dough is supported on the belt 11. An attendant directs the scrap dough which is formed in strings up on the lower edge of the apron 33 above the idler roll 36 and up in under the roll 35, which by the way is driven only by contact with the dough and the apron 33. Upon each oscillation of the shaft 27 this apron, together with the three rolls with which it is associated, moves in a forward direction and draws the scrap up. The scrap passes under the roll 35 and is carried along by the apron 33 and dumped in a trough 37. It may be removed by hand or dropped out by gravity if this trough is made slanting.

It is to be noted that the angular position of this mechanism is a matter of material importance. On account of the fact that in this type of cracker machine two adjacent diagonally located cutters contact with each other, the scrap is not formed merely of longitudinal and lateral strings all connected with each other at both sides of each blank. But the scrap as shown in Fig. 2 is formed of parallel but angularly located strings between the selvage connected with each other once only in the length of two contacting blanks.

The strings of scrap therefore, between connections or supports, are twice as long as in a cake machine cutting cakes of equal size. Although the dough is tougher and more consistent such scraps cannot be picked up by an ordinary mechanical "scrap-boy" and so far as I am aware it has never been done except by hand. But by placing the apron in the position indicated herein each of these strings is rolled up from one end and the motion up the scrap apron is substantially lengthwise with respect to these longer scrap strings and does not materially change their direction.

This arrangement provides for taking the margins or selvages of the scrap from the two sides of the sheet of dough at different points. If it were not for this angular location it would lift both selvages at exactly opposite points and therefore tend to lift the blanks. This principle applies also to each blank individually for the scrap on both sides of each is lifted at different times. In the present case the scrap on the lower side or rather the right hand side in Fig. 2 is lifted slightly in advance of the corresponding scrap on the left side of each blank. This prevents the lifting of the blanks with the scrap. In a case in which the scrap was lifted on both sides at once at the center of the blanks which are being fed forward, there would be a tendency to draw the two pieces of scrap together, thus engaging them more intimately with the blank than is normally the case. The blank being supported by two diametrically opposite pieces of scrap both rising together and located exactly transversely with respect to its center would tend to be lifted up with the scrap into the scrap picker. Now one side of the scrap is lifted from the blank before the other side starts to lift, at the center at least, and there is not much tendency to lift or displace the blank. It is to be understood, of course, that it is almost as bad to partly lift up the blank and then drop it in position to overlap another one as it is to have it go into the scrap picker itself. In that case both blanks have to be removed. The machine operates so rapidly in practice that it would not be possible for an operator to try to separate two blanks which have been placed one upon the other.

By this invention also it will be seen that it is possible to remove the scrap from the dough while the latter is moving forward in a plane and without necessitating the deflecting of the sheet of dough out of the plane in order to assist in separating the scrap. This is an advantage because no displacement of the blanks is necessitated by the employment of the mechanical scrap boy. On cake machines the sheet of cut dough is deflected downward just before the scrap remover acts and brushes or wires are used to poke the scrap out of the openings in which they are located in the dough. By this invention this is avoided.

This machine operates successfully on these cracker machines where the ordinary type of cake scrap picker has entirely failed. I attribute the success of this operation to the angular location of the apron. It is to be understood that the invention can also be applied successfully to soft cake and noodle machines, but is not so necessary there because the same trouble is not encountered on them.

Although I have illustrated and described only one form of the invention I am aware of the fact that many modifications can be made therein by any person skilled in the art without departing from the scope of the invention as expressed in the claims. Therefore I do not wish to be limited to all the details of construction herein shown and described, but what I do claim is:—

1. The combination with a dough cutting device comprising a movable member for supporting the dough, of a scrap removing device arranged over said movable member and having means for receiving the scrap from it, the scrap receiving edge of said means being located at an obtuse angle with respect to the direction of motion of said member.

2. In a machine of the character described, the combination with a traveling belt for supporting the dough, and means for cutting substantially contacting blanks from the dough and leaving them on the belt, of means located over the belt for receiving the scrap from the belt and lifting its opposite edges at different times.

3. In a machine of the character described, the combination with a traveling belt for supporting the dough, and means for cutting substantially circular blanks from the dough and leaving them on the belt, of an apron located over the belt and at an obtuse angle to the line of motion thereof for receiving the scrap from the belt and lifting its opposite edges at different times.

4. The combination with a cracker cutting machine having a movable support for the dough, of a scrap removing apron located over said support and arranged with its receiving edge at an obtuse angle to the line of motion thereof.

5. The combination with a cracker cutting machine having a movable support for the dough, of a scrap removing apron located over said supporting means and arranged with its receiving edge at an obtuse angle to the line of motion thereof, and means for operating said belt intermittently.

6. In a machine of the character described, the combination with a traveling belt for supporting the dough, and means for cutting substantially circular blanks from the dough and leaving them on the belt, of means located over the belt and at an obtuse angle to the line of motion thereof for receiving the scrap from the belt and lifting its opposite edges at different times, and means for operating said scrap lifting means intermittently while the cutting means is out of action.

In testimony whereof I have hereunto affixed my signature.

JOHN B. BOUDREAU, Jr.

Copies of this patent may be obtained for five cents each, by addressing the "Commissioner of Patents, Washington, D. C."